USo08886489B2

(12) United States Patent
Patel et al.

(10) Patent No.: US 8,886,489 B2
(45) Date of Patent: Nov. 11, 2014

(54) MOTION DETECTING METHOD AND DEVICE

(75) Inventors: Shwetak N. Patel, Seattle, WA (US); Matthew S. Reynolds, Durham, NC (US); Gregory D. Abowd, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 958 days.

(21) Appl. No.: 12/778,771

(22) Filed: May 12, 2010

(65) Prior Publication Data

US 2010/0288468 A1    Nov. 18, 2010

Related U.S. Application Data

(60) Provisional application No. 61/177,482, filed on May 12, 2009.

(51) Int. Cl.

| G01L 7/00 | (2006.01) |
|---|---|
| F24F 11/00 | (2006.01) |
| G01L 13/00 | (2006.01) |
| G08B 13/20 | (2006.01) |
| B01D 46/10 | (2006.01) |

(52) U.S. Cl.
CPC ............. *G01L 13/00* (2013.01); *F24F 11/0012* (2013.01); *G08B 13/20* (2013.01); *F24F 2011/0036* (2013.01); *F24F 11/0034* (2013.01); *B01D 46/10* (2013.01)
USPC ................... 702/138; 702/1; 702/13; 702/17; 702/19; 702/23

(58) Field of Classification Search
USPC .................. 702/45, 47, 50, 57, 138; 340/540; 165/59; 96/417, 421
See application file for complete search history.

(56) References Cited

U.S. PATENT DOCUMENTS

| 3,714,516 A | 1/1973 | Howe |
|---|---|---|
| 4,612,617 A | 9/1986 | Laplace, Jr. et al. |

(Continued)

FOREIGN PATENT DOCUMENTS

| CN | 101680676 | 3/2010 |
|---|---|---|
| DE | 102007032053 | 1/2009 |

(Continued)

OTHER PUBLICATIONS

Horst, G., Whirlpool Corporation: Woodridge Energy Study and Monitoring Pilot. pp. 1-99. 2006.56ty76.

(Continued)

*Primary Examiner* — Elias Desta
(74) *Attorney, Agent, or Firm* — Bryan Cave LLP

(57) ABSTRACT

In some embodiments, a motion detecting device is configured to detect whether one or more movement events have occurred. The motion detecting device can include: (a) a processing module configured to run on a computational unit; and (b) a sensing device having: (1) one or more pressure sensors configured to provide two or more pressure measurements; and (2) a transmitter electrically coupled to the one or more pressure sensors and configured to transmit the two or more pressure measurements to the computational unit. The processing module is configured to use the two or more pressure measurements to determine whether the one or more movement events have occurred. The sensing device can be configured to be placed in at least one of ductwork of a heating, ventilation, and air conditioning system or an air handler of the heating, ventilation, and air conditioning system. Other embodiments are disclosed.

14 Claims, 13 Drawing Sheets

(56) References Cited

U.S. PATENT DOCUMENTS

| | | | |
|---|---|---|---|
| 4,804,957 | A | 2/1989 | Selph et al. |
| 4,858,141 | A | 8/1989 | Hart et al. |
| 5,276,629 | A | 1/1994 | Reynolds |
| 5,409,037 | A | 4/1995 | Wheeler et al. |
| 5,441,070 | A | 8/1995 | Thompson |
| 5,483,153 | A | 1/1996 | Leeb et al. |
| 5,590,179 | A | 12/1996 | Shincovich et al. |
| 5,635,895 | A | 6/1997 | Murr |
| 5,717,325 | A | 2/1998 | Leeb et al. |
| 5,898,387 | A | 4/1999 | Davis et al. |
| 6,275,168 | B1 | 8/2001 | Slater et al. |
| 6,728,646 | B2 | 4/2004 | Howell et al. |
| 6,816,078 | B2 | 11/2004 | Onoda et al. |
| 6,839,644 | B1 | 1/2005 | Bryant et al. |
| 6,853,291 | B1 | 2/2005 | Aisa |
| 6,906,617 | B1 | 6/2005 | Van der Meulen |
| 7,019,666 | B2 | 3/2006 | Tootoonian Mashhad et al. |
| 7,043,380 | B2 | 5/2006 | Rodenberg, III et al. |
| 7,244,294 | B2* | 7/2007 | Kates ............................. 96/417 |
| 7,276,915 | B1 | 10/2007 | Euler et al. |
| 7,400,986 | B2 | 7/2008 | Lathan et al. |
| 7,460,930 | B1 | 12/2008 | Vinson et al. |
| 7,493,221 | B2 | 2/2009 | Caggiano et al. |
| 7,498,935 | B2 | 3/2009 | Kodama et al. |
| 7,546,214 | B2 | 6/2009 | Rivers, Jr. et al. |
| 7,612,971 | B2 | 11/2009 | Premerlani et al. |
| 7,656,649 | B2 | 2/2010 | Loy et al. |
| 7,702,421 | B2 | 4/2010 | Sullivan et al. |
| 7,873,449 | B2* | 1/2011 | Bujak et al. ................. 701/33.7 |
| 8,199,005 | B2* | 6/2012 | Thomas et al. ............... 340/540 |
| 8,219,250 | B2* | 7/2012 | Dempster et al. ............ 700/276 |
| 2001/0003286 | A1 | 6/2001 | Philippbar et al. |
| 2002/0010690 | A1 | 1/2002 | Howell et al. |
| 2003/0050737 | A1 | 3/2003 | Osann et al. |
| 2003/0088527 | A1 | 5/2003 | Hung et al. |
| 2003/0097348 | A1 | 5/2003 | Cao |
| 2003/0193405 | A1 | 10/2003 | Hunt et al. |
| 2004/0128034 | A1 | 7/2004 | Carroll et al. |
| 2004/0140908 | A1 | 7/2004 | Gladwin et al. |
| 2004/0206405 | A1 | 10/2004 | Villeneuve et al. |
| 2005/0060107 | A1 | 3/2005 | Rodenberg, III et al. |
| 2005/0067049 | A1 | 3/2005 | Fima et al. |
| 2006/0009928 | A1 | 1/2006 | Addink et al. |
| 2006/0077046 | A1 | 4/2006 | Endo |
| 2006/0195275 | A1 | 8/2006 | Latham et al. |
| 2006/0245467 | A1 | 11/2006 | Casella et al. |
| 2008/0079437 | A1 | 4/2008 | Robarge et al. |
| 2008/0086394 | A1 | 4/2008 | O'Neil et al. |
| 2008/0091345 | A1 | 4/2008 | Patel et al. |
| 2008/0224892 | A1 | 9/2008 | Bogolea et al. |
| 2008/0255782 | A1 | 10/2008 | Bilac et al. |
| 2009/0045804 | A1 | 2/2009 | Durling et al. |
| 2009/0072985 | A1 | 3/2009 | Patel et al. |
| 2009/0295578 | A1* | 12/2009 | Gantt ............................ 340/544 |
| 2010/0030393 | A1 | 2/2010 | Masters et al. |
| 2010/0070214 | A1 | 3/2010 | Hyde et al. |
| 2010/0070218 | A1 | 3/2010 | Hyde et al. |
| 2010/0109842 | A1 | 5/2010 | Patel et al. |
| 2010/0188262 | A1 | 7/2010 | Reymann et al. |
| 2011/0004421 | A1 | 1/2011 | Rosewell et al. |

FOREIGN PATENT DOCUMENTS

| | | |
|---|---|---|
| EP | 1136829 | 9/2001 |
| FR | 2645968 A | 10/1990 |
| WO | 9304377 | 3/1993 |
| WO | WO 2009081407 | 7/2009 |
| WO | 2010007369 | 1/2010 |

OTHER PUBLICATIONS

Study Finds Elder Care a Growing Emotional and Financial Burden for Baby Boomers New ADT Monitoring Service for Elderly Helps Ease the Stress of Long Distance Care Giving, 4 pages. 2005.

Ninomura, P., Rousseau, C., Bartley, J., Guidelines for Design and Construction of Hospital and Health Care Facilities, Rx for Health-Care HVAC—A Supplement to ASHRAE Journal, pp. H33-H37. 2006.

Tapia, E., Activity Recognition in the Home Setting Using Simple and Ubiquitous Sensors, In the Proceedings of Pervasive 2004, pp. 158-175. 2004.

Bian, X., Abowd, G., Rehg, J., Using Sound Source Localization to Monitor and Infer Activities in the Home, In the Proceedings of the Pervasive 2005, pp. 19-26, 2005.

Beckmann, C., Consolvo, S., and LaMarca, A., Some Assembly Required: Supporting End-User Sensor Installation in Domestic Ubiquitous Computing Environments, In the Proceedings of Ubicomp 2004, pp. 107-124. 2004.

Chen, J., Kam, A., Zhang, J., Liu, N., Shue, L., Bathroom Activity Monitoring Based on Sound, In the Proceedings of Pervasive 2005. pp. 47-61. 2005.

Chetty, M., Sung, J., Grinter, R., How Smart Homes Learn: The Evolution of the Networked Home and Household, In the Proceedings of Ubicomp 2007. pp. 127-144. 2007.

Fogarty, J., Au, C., and Hudson, S., Sensing from the Basement: A Feasibility Study of Unobtrusive and Low-Cost Home Activity Recognition, In the Proceedings of ACM Symposium on User Interface Software and Technology 2006, pp. 91-100. 2006.

Hirsch, T., Forlizzi, J., Hyder, E., Goetz, J., Kurtz, C., Stroback, J., The ELDer Project: Social and Emotional Factors in the Design of Eldercare Technologies, Conference on Universal Usability 2000, pp. 72-79. 2000.

Mountain, D., Price Influences Demand, DeGroote School of Business, McMaster University, 16 pages. 2008.

Intersema MS5536 Product Sheet. 2007.

Koile, K., Tollmar, K., Demirdjian, D., Shrobe, H., and Darrell, T., Activity Zones for Context-Aware Computing, In the Proceedings of UbiComp 2003. pp. 90-106. 2003.

Nishimura, T., "Heat Pumps—Status and Trends" in Asia and the Pacific, International Journal of Refrigeration, pp. 405-413. 2000.

Nadel, S., Increasing Appliance Energy Savings by Looking Beyond the Current Energy Star, ACEEE, 25 pages. 2004.

Ninomura, P., Bartley, J., New Ventilation Guidelines for Health Care Facilities, ASHRAE Journal, pp. 29-33. 2002.

Orr, R. and Abowd, G., The Smart Floor: A Mechanism for Natural User Identification and Tracking, In the Proceeding of the 2000 Conference on Human Factors in Computing Systems, 9 pages. 2000.

Rowan, J., Mynatt, E., Digital Family Portrait Field Trial: Support for Aging in Place, In the Proceeding of the 2009 Conference on Human Factor in Computing Systems: Assistive Appliances, pp. 521-530. 2005.

Froehlich, J., Everitt, K., Fogarty, J., Patel, S., Landay, J., Sensing Opportunities for Personalized Feedback Technology to Reduce Consumption. UW CSE Technical Report: CSE 09-13-01, 7 pages. Jun. 2009.

Tapia, E., Activity Recognition in the Home Setting Using Simple and Ubiquitous Sensors, Master's Thesis. 2003.

Wilson, D., Atkeson, C., STAR: Simultaneous Tracking and Activity Recognition Using Many Anonymous Binary Sensors. Pervasive 2005, pp. 2005.

Wren, C. and Munguia-Tapia, E., Toward Scalable Activity Recognition for Sensor Networks. In the Proceedings of LoCA 2006, pp. 168-185. 2006.

Yang, Z. and Bobick, A., Visual Integration from Multiple Cameras, In the Proceedings of WACV/MOTION 2005, pp. 488-493. 2005.

Patel, S.N., Robertson, T., Kientz, J.A., Reynolds, M.S., Abowd, G.D.: At the Flick of a Switch: Detecting and Classifying Unique Electrical Events on the Residential Power Line. In the Proceedings of Ubicomp 2007, pp. 271-288. 2007.

Patel, S., Truong, K., Abowd, G., PowerLine Positioning: A Practical Sub-Room-Level Indoor Location System for Domestic Use, In the Proceedings of Ubicomp 2006, pp. 441-458. 2006.

Patel, S., Bringing Sensing to the Masses: An Exploration in Infrastructure-Mediated Sensing (slides and transcript of presentation), Intel Labs Seattle, Washington, 133 pages. Apr. 28, 2008.

(56) References Cited

OTHER PUBLICATIONS

Tapia, E.M., Intille, S.S., Lopez, L., Larson, K.: The design of a portable kit of wireless sensors for naturalistic data collection. In the Proceedings of Pervasive 2006. LNCS, vol. 3968, pp. 117-134. 2006.

Iachello, G., Abowd, G.D.: Privacy and Proportionality: Adapting Legal Evaluation Techniques to Inform Design in Ubiquitous Computing. In the Proceedings of CHI 2005, pp. 91-100. 2005.

Patel, S., Gupta S., and Reynolds M., End-User-Deployable Whole House Contact-Less Power Consumption Sensing, UbiComp 2009, 4 pages. 2009.

Mountain, D., Summary The Impact of Real-Time Feedback on Residential Electricity Consumption: The Hydro One Pilot, 4 pages. 2006.

Darby, S., Making it Obvious: Designing Feedback into Energy Consumption, Proceedings of the Second International Conference on Energy Efficiency in Household Appliances and Lighting, 11 pages. 2000.

Froehlich, J., Sensing and Feedback of Everyday Activities to Promote Environmentally Sustainable Behaviors, Thesis Proposal, Computer Science and Engineering, University of Washington, 35 pages. 2009.

Brandon, G., Lewis A., Reducing Household Energy Consumption: A Qualitative and Quantitative Field Study, Journal of Environmental Psychology, pp. 75-85. 1999.

Parker, D., Hoak, D., Cummings, J., Contract Report: Pilot Evaluation of Energy Savings from Residential Energy Demand Feedback Devices, Florida Solar Energy Center, A Research Institute of the University of Central Florida, 32 pages. 2008.

Ueno, T., Inada, R., Saeki, O., Tsuji, K., Effectiveness of Displaying Energy Consumption Data in Residential Houses Analysis on How the Residents Respond, ECEEE 2005 Summer Study—What Works and Who Delivers?, pp. 1289-1299. 2005.

Arvola, A., Uutela, A., Anttila, U., Billing Feedback as a Means to Encourage Household Electricity Conservation: A Field Experiment in Helsinki, Proceedings of the 1993 Summer Study of the European Council for Energy Efficient Economy. pp. 11-21. 2003.

Darby, S., The Effectiveness of Feedback on Energy Consumption, Environmental Change Institute, University of Oxford, 21 pages. 2006.

Fischer, C., Feedback on Household Electricity Consumption: A Tool for Saving Energy?, Energy Efficiency, pp. 79-104. 2008.

Drenker et al., Nonintrusive Monitoring of Electrical Loads, IEEE Xplore, 5 pages. Oct. 1999.

Hart, Nonintrusive Appliance Load Monitoring, IEEE Xplore, 22 pages. Dec. 1992.

Murata et al., Estimation of Power Consumption for Household Electric Appliances, Proceedigns of the 9th International Conference on Neural Informatin Processing (ICONIP'02), vol. 6, 5 pages. 2002.

Prudenzi, A Neuron Nets Based Procedure for Identifying Domestic Appliances Pattern-of-Use from Energy Recordings at Meter Panel, IEEE, 6 pages. 2002.

Laughman et al., Power Signature Analysis, IEEE, 8 pages. Mar./Apr. 2003.

* cited by examiner

100

400

500

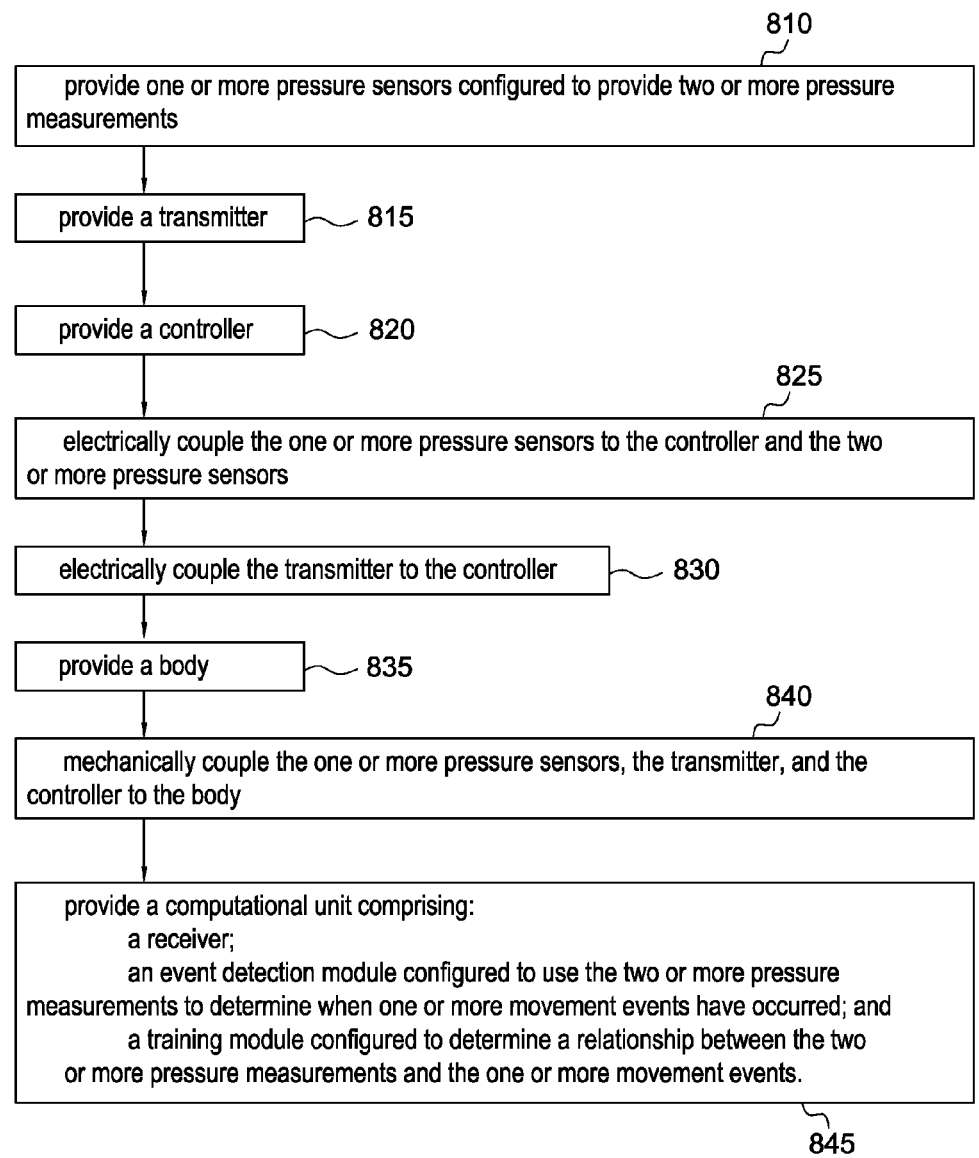

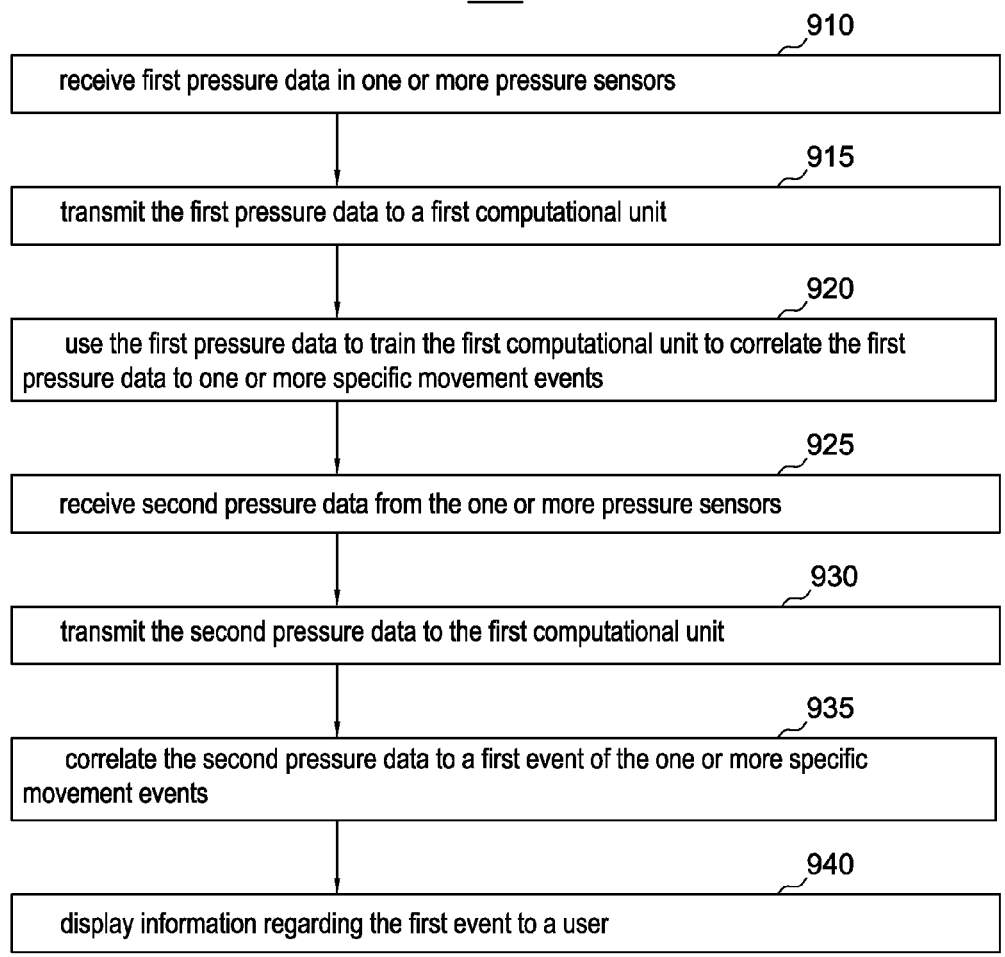

FIG. 10

Table 1. Descpriptions of the homes in which the system was tested. The deployment lasted approximately 3-4 weeks.

| Home | Year Built | No. of HVAC Units Tested | Floors/ Total Size (Sq Ft) /Sq M) | Style/ No. of occupants | Bedrooms/ Bathrooms/ Total Rms./ Doorways considered | Deploy Length (weeks) |
|---|---|---|---|---|---|---|
| 1 | 2003 | 3 | 3/4000/371 | 1 Family Home/3 | 4/4/13/20 | 4 |
| 2 | 2001 | 1 | 1/1600/149 | 1 Family Home/5 | 3/2/7/10 | 3 |
| 3 | 1997 | 1 | 1/700/58 | 1 Bed Apt/2 | 1/1/5/5 | 3 |
| 4 | 1986 | 1 | 1/500/46 | 1 Bed Studio/1 | 1/1/3/4 | 4 |

FIG. 11

Table 2. Performance results of the manually-labeled experiments with the HVAC in operation. The accuracies are shown using 10-fold cross validation.

| Home/ Floor | No. of Doorways Tested | No. of Door Instances/ People Instances | Door Majority Classif. (%) | Door Classif. Accuracy (%) | People Majority Classif. (%) | People Classif. Accuracy (%) |
|---|---|---|---|---|---|---|
| 1/1 | 5 | 375/375 | 21 | 84 | 23 | 72 |
| 1/2 | 4 | 300/300 | 18 | 61 | 18 | 42 |
| 1/3 | 11 | 825/600 | 9 | 77 | 12 | 61 |
| 2 | 10 | 750/400 | 8 | 73 | 10 | 63 |
| 3 | 5 | 375/375 | 20 | 74 | 20 | 70 |
| 4 | 4 | 300/300 | 26 | 81 | 25 | 76 |

FIG. 12

Table 3. Confusion matrix of the classification results from the controlled experiments in Home 1/3 (HVAC in operation). D1-D11 represent each doorway.

|     | D1 | D2 | D3 | D4 | D5 | D6 | D7 | D8 | D9 | D10 | D11 |
|-----|----|----|----|----|----|----|----|----|----|----|----|
| D1  | 72 | 0  | 0  | 0  | 1  | 0  | 0  | 1  | 0  | 0  | 1  |
| D2  | 1  | 57 | 0  | 2  | 0  | 2  | 6  | 4  | 0  | 1  | 2  |
| D3  | 0  | 1  | 60 | 1  | 0  | 1  | 3  | 2  | 5  | 2  | 0  |
| D4  | 0  | 0  | 1  | 57 | 2  | 0  | 0  | 4  | 3  | 6  | 2  |
| D5  | 4  | 0  | 1  | 4  | 52 | 5  | 0  | 6  | 2  | 0  | 1  |
| D6  | 5  | 1  | 0  | 0  | 6  | 53 | 4  | 2  | 0  | 1  | 3  |
| D7  | 0  | 2  | 3  | 3  | 0  | 1  | 61 | 0  | 3  | 2  | 0  |
| D8  | 6  | 0  | 0  | 0  | 2  | 1  | 1  | 55 | 5  | 0  | 5  |
| D9  | 1  | 0  | 4  | 0  | 1  | 5  | 2  | 0  | 59 | 2  | 1  |
| D10 | 2  | 2  | 7  | 0  | 3  | 3  | 8  | 0  | 2  | 43 | 5  |
| D11 | 0  | 1  | 0  | 0  | 0  | 2  | 0  | 0  | 0  | 2  | 70 |

FIG. 13

Table 4. Performance results of the manually labeled door open/close events for when the HVAC is not in operation

| Home/ Floor | No. of Doorways Tested | No. of Door Event Instances | Door Majority Classif. (%) | Door Classif. Accuracy (%) |
|---|---|---|---|---|
| 1/1 | 5  | 125 | 20 | 66 |
| 1/2 | 4  | 100 | 25 | 47 |
| 1/3 | 11 | 275 | 9  | 64 |
| 2   | 10 | 250 | 10 | 69 |
| 3   | 5  | 125 | 20 | 71 |
| 4   | 4  | 100 | 25 | 68 |

FIG. 14

Table 5. The percentage of events that the system was able to detect. This is determined by comparing the number of detected events to the number of doorway events gathered by the motion sensors. The results include events detected with HVAC both on and off.

| Home/Floor | No. of Doorsways Tested | No. of Total Motion Sensor Events | No. of Total Detected Events | HVAC On: Detected Events (%) | HVAC Off: Detected Events (%) |
|---|---|---|---|---|---|
| 1/1 | 5 | 53 | 48 | 91 | 68 |
| 1/2 | 4 | 94 | 60 | 64 | 35 |
| 1/3 | 11 | 238 | 195 | 82 | 73 |
| 2 | 10 | 467 | 334 | 72 | 64 |
| 3 | 5 | 245 | 198 | 81 | 70 |
| 4 | 4 | 61 | 51 | 84 | 77 |

FIG. 15

Table 6. The performance of using the learning approach to the data from the long-term deployment. The motion sensor data was used to label each event, so the dataset consists of *in situ* event instances. The accuracies are shown using 10-fold cross validation.

| Home/Floor | No. of Doorways Tested | No. of Doorway Transition Instances | Door Majority Classif. (%) | Door Classif. Accuracy (%) | People Majority Classif. (%) | People Classif. Accuracy (%) |
|---|---|---|---|---|---|---|
| 1/1 | 5 | 48 | 26 | 65 | 28 | 61 |
| 1/2 | 4 | 60 | 26 | 53 | 26 | 42 |
| 1/3 | 11 | 195 | 14 | 72 | 17 | 63 |
| 2 | 10 | 334 | 19 | 62 | 12 | 65 |
| 3 | 5 | 198 | 28 | 72 | 23 | 71 |
| 4 | 4 | 51 | 34 | 78 | 38 | 81 |

MOTION DETECTING METHOD AND DEVICE

CROSS-REFERENCE TO RELATED APPLICATIONS

This application claims the benefit of U.S. Provisional Application No. 61/177,482, filed May 12, 2009. U.S. Provisional Application No. 61/177,482 is incorporated herein by reference

FIELD OF THE INVENTION

This invention relates generally to apparatuses and methods for detecting movement events, and relates more particularly to such apparatuses and methods that detecting movement events using heating, ventilation, and air conditioning (HVAC) systems.

DESCRIPTION OF THE BACKGROUND

Development of low-cost and easy-to-deploy sensing systems to support movement detection in a home or another building has been an active research area. Much of the development has centered on the deployment of a network of inexpensive sensors throughout the home, such as motion detectors or simple contact switches. Although these solutions are cost-effective on an individual sensor basis, they are not without some important drawbacks that limit the likelihood of eventual commercial success through broad consumer acceptance.

Commonly used sensors for detecting human activity in the home include high-fidelity sensors such as visible light and infrared (IR) cameras or microphones, as well as low-fidelity sensors such as passive infrared (PIR) motion detectors and floor weight sensors. High-fidelity distributed direct sensing has a long history of use in activity detection and classification research, primarily focused on computer vision or machine learning systems that capture the movement of people in spaces. The use of these high fidelity sensors in certain spaces often raises concerns about the balance between value-added services and acceptable surveillance, particularly in home settings. Low-fidelity, distributed direct sensing systems use of a large collection of simple, low cost sensors, such as motion detectors, pressure mats, break beam sensors, and contact switches.

All distributed direct sensing approaches share the advantages and disadvantages of placing each sensor in close proximity to where human activity occurs. For example, commonly used cameras or PIR sensors require a clear line of sight to the desired room coverage area. That is, the person being sensed will be able to see the camera or PIR sensor. Generally, cameras or PIR sensors when deployed on walls, on ceilings, or above a door have adverse aesthetics effects on the area around where the cameras or PIR sensors are deployed. Furthermore, the large number of sensors required for coverage of an entire building presents an inherent complexity hurdle. Installation and maintenance of (typically) tens of sensors in a home, or hundreds to thousands of sensors in a larger building such as a hotel, hospital, or assisted living facility, results in high costs during installation and operation.

It is often difficult to balance the value of in-home sensing and the complexity of the sensing infrastructure. One example that illustrates this difficulty is the Digital Family Portrait system, a peace of mind application for communicating well-being information from an elderly person's home to a remote caregiver. In the system's deployment study, movement data was gathered from a collection of strain sensors attached to the underside of the first floor of an elder's home. The installation of these sensors was difficult, time-consuming, and required direct access to the underside of the floor. Though the value of the application was proven, the complexity and cost of the sensing limited the number of homes in which the system could be deployed easily.

Accordingly, a need or potential for benefit exists for an apparatus and/or method that allows detection of movement events without the high cost and installation complexity of currently available motion detection systems and methods.

BRIEF DESCRIPTION OF THE DRAWINGS

To facilitate further description of the embodiments, the following drawings are provided in which:

FIG. 8 illustrates a flow chart for an embodiment of a method of providing a motion sensor, according to an embodiment;

FIG. 9 illustrates a flow chart for an embodiment of a method of detecting movement, according to an embodiment;

FIG. 10 illustrates a chart of descriptions of homes used to test an example of a motion detecting device, according to an embodiment;

FIG. 11 illustrates a chart of results of a first experiment using an example of a motion detecting device, according to an embodiment;

FIG. 12 illustrates a chart of a confusion matrix for the results of the first experiment using the same example of the motion detecting device, according to an embodiment;

FIG. 13 illustrates a chart of results of a second experiment using the same example of the motion detecting device, according to an embodiment;

FIG. 14 illustrates a chart of results of the first and second experiment using the same example of the motion detecting device, according to an embodiment;

FIG. 15 illustrates a chart of results of a third experiment using the same example of the motion detecting device, according to an embodiment;

Figure 1:
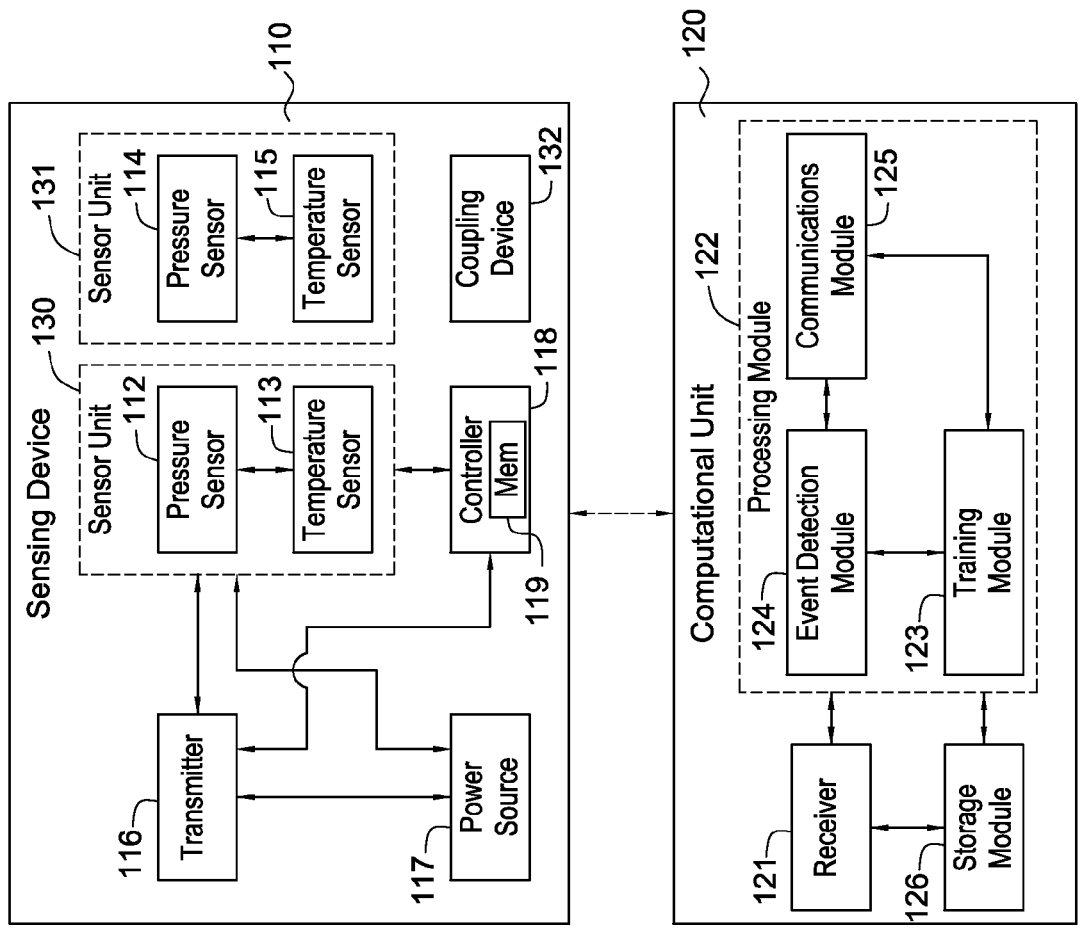
FIG. 1 illustrates a block diagram of a motion detecting device, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION OF EXAMPLES OF EMBODIMENTS

In some embodiments, a motion detecting device is configured to detect whether one or more movement events have occurred. The motion detecting device can include: (a) a processing module configured to run on a computational unit; and (b) a sensing device having: (1) one or more pressure sensors configured to provide two or more pressure measurements; and (2) a transmitter electrically coupled to the one or more pressure sensors and configured to transmit the two or more pressure measurements to the computational unit. The processing module is configured to use the two or more pressure measurements to determine whether the one or more movement events have occurred. The sensing device is configured to be placed in at least one of ductwork of a heating, ventilation, and air conditioning system or an air handler of the heating, ventilation, and air conditioning system.

In further embodiments, a method of detecting movement can include: performing two or more first measurements of air pressure in a duct of a heating, ventilation, and air conditioning system; transmitting the two or more first measurements of the air pressure; determining one or more first changes of the air pressure based on the two or more first measurements of the air pressure; and associating at least one of the one or more first changes of the air pressure with a first movement event.

In other embodiments, a method of providing a motion sensor includes: providing one or more pressure sensors configured to provide two or more pressure measurements; providing a transmitter; electrically coupling the transmitter to the one or more pressure sensors; providing a body; mechanically coupling the one or more pressure sensors and the transmitter to the body; and providing a processing module configured to run on a computational unit, the processing module having an event detection module configured to use the two or more pressure measurements to determine whether one or more movement events have occurred.

In still other embodiments, an air filter unit can include: (a) an air filter having: (1) a filter material; (2) an outer frame located around the filter material; (3) at least one pressure sensor disposed proximate to at least one of the filter material or the outer frame and configured to provide two or more pressure measurements; and (4) a transmitter electrically coupled to the at least one pressure sensor; and (b) a processing module configured to run on a computational unit, the processing module configured to determine an occurrence of one or more movement events based on the two or more pressure measurements of the at least one pressure sensor.

In yet further embodiments, a heating, ventilation, and air conditioning system can include: (a) an air handler; (b) at least one pressure sensor located at the air handler; and (c) a processing module configured to run on a computational unit. The processing module is electrically coupled to the at least one pressure sensor via the computational unit and configured to determine the occurrence of one or more movement events based on two or more pressure measurements of the at least one pressure sensor.

Figure 2:
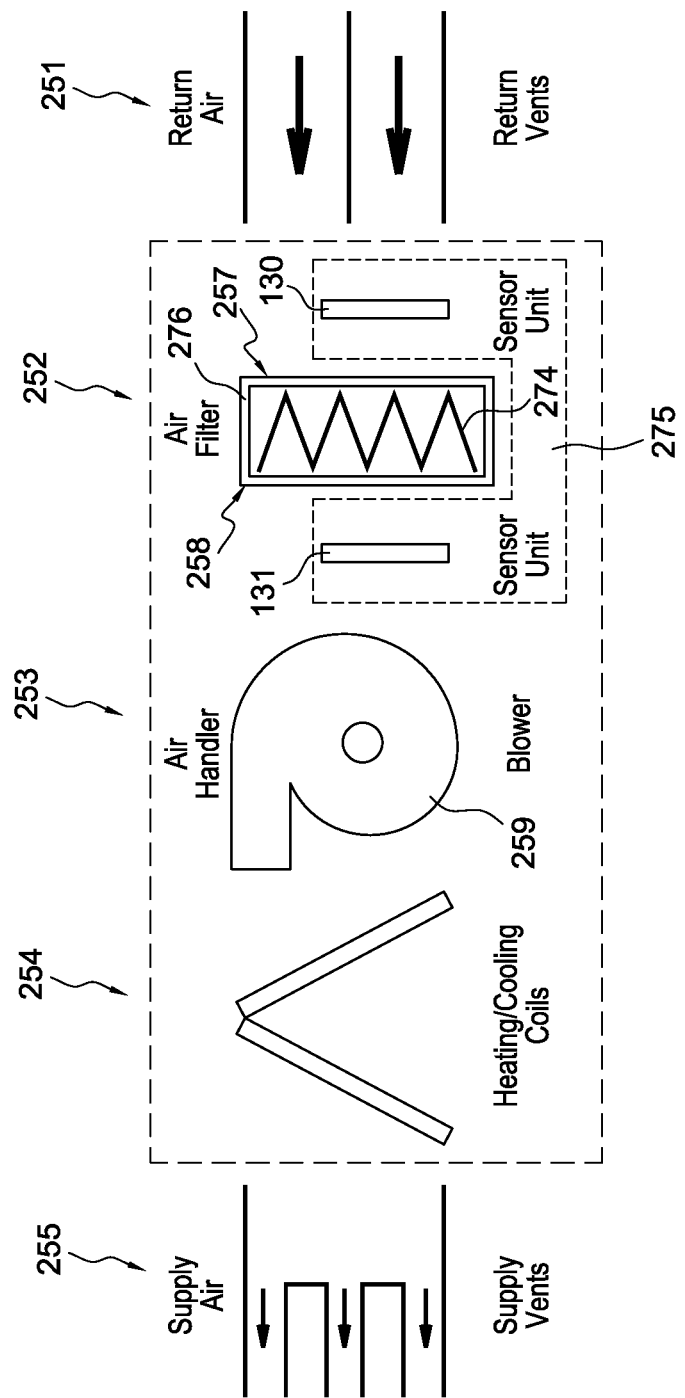
FIG. 2 illustrates an implementation of sensor units of the motion detecting device of FIG. 1 in an exemplary heating, ventilation, and air conditioning (HVAC) system, according to the first embodiment.
Figure 3:
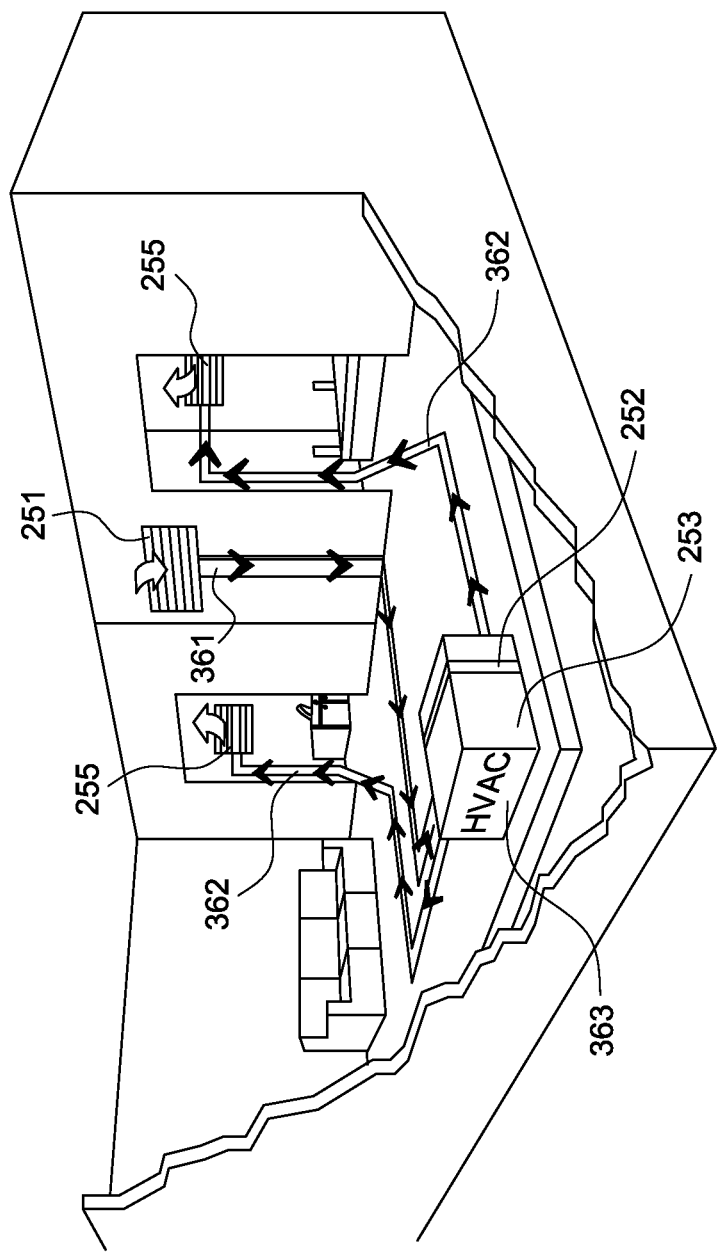
FIG. 3 illustrates another view of the exemplary HVAC system of FIG. 2 in an exemplary home, according to the first embodiment.

Turning to the drawings, FIG. 1 illustrates a block diagram of a motion detecting device 100, according to a first embodiment. FIG. 2 illustrates an implementation of sensor units 130 and 131 of motion detecting device 100 in an exemplary HVAC system 250, according to the first embodiment. FIG. 3 illustrates another view of exemplary heating, ventilation, or air conditioning (HVAC) system 250 in an exemplary residential setting 360, according to the first embodiment. Motion detecting device 100 is merely exemplary and is not limited to the embodiments presented herein. Motion detecting device 100 can be employed in many different embodiments or examples not specifically depicted or described herein. For example, motion detecting device 100 can be deployed in HVAC systems in a commercial or residential setting not specifically depicted or described herein. In some embodiments, an electrical device or motion detecting device 100 can be configured to detect when one or more movement events have occurred.

Some embodiments provide a whole-house or whole-building system and method for detecting gross movement and room transitions by sensing differential air pressure at a single point in the house or building. This system and method can leverage the central heating, ventilation, and air conditioning (HVAC) systems found in many homes and buildings To aid understanding of motion detecting device 100, the home can be considered a closed circuit for air circulation, where HVAC system 250 provides a centralized airflow source and therefore a convenient single monitoring point for the whole airflow circuit. Disruptions in home airflow caused by human movement through a house or building, especially those caused by the blockage of doorways and thresholds, results in static pressure changes in an air handler 253 (FIGS. 2 and 3) of HVAC system 250 when the HVAC system 250 is operating.

In a simple, but not limiting example, motion detecting device 100 detects and records static pressure changes in air handler 253 (FIGS. 2 and 3) of HVAC system 250 using pressure sensors 112 and 114 (FIG. 1) mounted at air filter 252 (FIG. 2). Motion detecting device 100 can classify where certain movement events are occurring in a house or building, such as an adult walking through a particular doorway or the opening and closing of a particular door. Motion detecting device 100 also is capable of detecting movement events when the HVAC system 250 is not operating. Furthermore, by observing the opening and closing of doors and the movement of people transitioning from room to room and/or by training motion detecting device 100, the location and activity of people in the space can be inferred by motion detecting device 100. In addition, detecting a series of room transitions can be used by motion detecting device 100 for simple occupancy detection or to estimate a person's path in a house or building.

An advantage of this approach, when compared to installing motion sensors throughout an entire house, is that it requires the installation of only a single or small number of sensing devices 110 that are wirelessly coupled to a computational unit 120 (FIG. 1). Installing and maintaining a single or small number of sensing devices 110 instead of ten or hundreds of motion sensors that can be required by other systems can save a significant amount of money and manpower.

Referring to FIGS. 1-2, motion detecting device 100 can include: (a) a sensing device 110 configured to be placed in ductwork of HVAC system 250; and (b) computational unit 120. Sensing device 110 can include: (a) one or more sensor units 130 and 131; (b) a transceiver or transmitter 116; (c) a power source 117; (d) a controller 118 with memory 119; and (e) a coupling device 132.

In some examples, sensor unit 130 can include pressure sensor 112 and a temperature sensor 113. Sensor unit 131 can include pressure sensor 114 and a temperature sensor 115. Sensor units 130 and 131 can be configured such that temperature sensors 113 and 115 measure a temperature at pressure sensors 112 and 114. In some examples, sensor units 130 and 131 can include temperature sensors 113 and 115 to calibrate pressure sensors 112 and 114, respectively. In some examples, more than two pressure sensors can be used. Using multiple sensor distributed across the sensing area (e.g., an air filter) can improve the accuracy of the measurements and thus, the detection of movement events.

In some embodiments, pressure sensors 112 and 114 can be differential pressure sensors. In the same or different embodiments, pressure sensors 112 and 114 can be absolute pressure sensors. In various embodiments, pressure sensors 112 and 114 can have a resolution of 0.1 millibar, provide a stable output of up to two bars, and have a maximum rating of up to five bars. For example, sensor units 130 and 131 can be Intersema MS5536 piezoresistive pressure sensor modules, manufactured by MEAS Switzerland SA. Intersema MS5536 piezoresistive pressure sensor modules include both a pressure sensor and a temperature sensor along with a built-in analog-to-digital (A/D) converter. In other examples, sensor units 130 and 131 include pressure sensors 112 and 114, but not temperature sensors 113 and 115, respectively. In the same or different example, sensor units 130 and 131 do not have any A/D converters, which can be contained within controller 118.

In some examples, controller 118 can be configured to receive pressure and temperature measurements from sensor units 130 and 131. In some examples, controller 118 can perform some processing of the pressure and temperature measurements before communicating information about the pressure measurements to computational unit 120 via transmitter 116.

In some examples, controller 118 can sample pressure sensors 112 and 114 and temperature sensors 113 and 115 at predetermined intervals. In some embodiments, controller 118 can sample the pressure and temperature measurements every 20 milliseconds to 100 milliseconds (e.g., 35 milliseconds). That is, each of pressure sensors 112 and 114 can be configured to provide a series of pressure measurements to controller 118 and/or transmitter 116. For example, each of pressure sensors 112 and 114 can provide a first pressure measurement at a first time, a second pressure measurement at a second time, and a third pressure measurement at a third time, where the first time is before the second time and third time and where the second time is before the third time.

After sampling the temperature and pressure measurements, controller 118 can calculate a temperature-compensated pressure value for each of sensor units 130 and 131. In some examples, a temperature compensation formula or temperature compensation information provided by the manufacturer of pressure sensors 112 and 114 can be used to calculate the temperature-compensated pressure values. In some examples, controller 118 can be a microcontroller such as part no. ATMEGA8L-8AU, manufactured by Atmel Corporation of San Jose, Calif.

Transmitter 116 can be electrically coupled to sensor units 130 and 131 and controller 118. In some examples, transmitter 116 communicates the temperature-compensated pressure values provided by controller 118 to receiver 121 of computational unit 120. In other examples, transmitter 116 transmits the raw pressure and temperature measurements to receiver 121. In still other examples, transmitter 116 can communicate the temperature-compensated pressure values provided by controller 118 along with the raw pressure and temperature measurements to receiver 121.

In some examples, transmitter 116 can be a wireless transmitter, and receiver 121 can be a wireless receiver. In some examples, electrical signals can be transmitted using WI-FI (wireless fidelity), the IEEE (Institute of Electrical and Electronics Engineers) 802.11 wireless protocol or the Bluetooth 3.0+HS (High Speed) wireless protocol. In further examples, these signals can be transmitted via a Zigbee (802.15.4), Z-Wave, or a proprietary wireless standard. In other examples, transmitter 116 can transmit electrical signals using a cellular or wired connection.

HVAC system 250 is a device used to circulate heated, cooled, filtered, or conditioned air throughout a space (e.g., a house, an apartment, or an office). Although central home HVAC systems are not as prevalent in some geographic regions as plumbing or electrical infrastructure, a significant number of homes or buildings have central HVAC systems. Because central HVAC systems are more efficient than using a collection of window units, the upward trend in energy cost has driven the use of central HVAC systems to a growing number of homes. In 1997, 66% of the homes in the United States and Canada were reported to have central HVAC systems, and its prevalence is growing at a fast rate. In addition, nearly all new homes built in the southern part of the U.S. and 80% in the rest of the U.S. and Canada have central HVAC systems installed during construction. Europe and Australia show a similar trend, with approximately 55% of homes using central HVAC systems. Regardless of the regional prevalence of central HVAC systems, the value of motion detection device 100 becomes more apparent in larger homes or in assisted living facilities that have many rooms, precisely the settings where installing many distributed sensors is economically unattractive.

HVAC systems will probably increase in prevalence because they can provide more functionality than just heating and cooling. Recent EnergyStar reports have shown that running the HVAC for longer periods of time, but using alternate conditioning features, such an air-to-air exchanger, is more energy efficient. This EnergyStar report also recommends that HVAC systems incorporate whole house HEPA (high efficiency particulate absorbing) filtration. Construction codes, such as for hospitals and assistive care facilities, also have a minimum air movement requirements to ensure proper filtration. All of these factors increase the motivation for having the HVAC systems in operation, increasing the effectiveness of our sensing approach. Running the air handler's fan of a standard 2-ton (24,000 BTU (British Thermal Units)) HVAC system continuously for an entire month would cost about $6 US (assuming an electricity price of $0.05 US per 1 kW-h (kilowatts per hour)), which would need to be balanced against any value-added capability motion detection device 100 provides. As used herein, HVAC system refers to a heating system alone, a ventilation system alone, an air conditioning system alone or a combined heating, ventilation, and air conditioning system.

As illustrated in FIGS. 2 and 3, HVAC system 250 can include: (a) air handler 253; (b) one or more return vents 251; (c) one or more supply vents 255; (d) ducts 361 (FIG. 3) coupling return vents 251 to air handler 253; and (e) ducts 362 (FIG. 3) coupling air handler 253 to supply vents 255.

As illustrated in FIG. 2, air handler 253 can include: (a) a blower 259; (b) heating/cooling coils 254; (c) air filter 252; and (d) dampers (not shown). In some examples, blower 259, heating/cooling coils 254, air filter 252, and the dampers can be located in a large, non-permanently sealed box 363 (FIG. 3). In other examples, air filter 252 can be located at other points in HVAC system 250. For example, air filter 252 can be located at one of return vents 251.

During its operation, a pressure differential, $\Delta P$, know as the total static pressure, is built up in blower 259. The total static pressure is a measure of resistance imposed on blower 259 in air handler 253. The total static pressure is affected by a variety of factors that impede the airflow between the return vents 251 and supply vents 255. These factors includes the length of ducts 361 and 362, the number of fittings used in ducts 361 and 362, closed air vents, and/or dirty air filters. When installing HVAC system 250, a technician usually takes care in properly balancing the total static pressure to ensure its proper operation. This balance includes installing sufficient supply ducts 361 and return ducts 362 in proper locations. Technicians also install ductwork to various rooms to ensure effective coverage. FIG. 3 shows a partial cross-sectional drawing of a home and example locations of the return vents 251 and supply vents 255 and the potential associated airflow paths.

When HVAC system 250 is running, air flows from supply vents 255 to return vents 251 through the conditioned space (e.g., a room). There is typically some airflow from each of return vents 251 to all supply vents 255. Depending on the location of vents 251 and 255, the airflow paths and amount of airflow can vary. When there is disruption to the airflow, there is a change in the total static pressure in air handler 253 as a result of the resistance in the airflow. Depending on the location of supply vents 255, a disruption in airflow can cause a more persistent change in the overall static pressure, such as from a direct blockage of a return vent. One contributor to this airflow disruption is doorways, where airflow can either be disrupted by the closing or opening of a door or the partial blockage of an adult passing through the threshold. Sometimes, an individual may even feel the "resistance" from the airflow when trying to open a door. Also, depending on the location in the house where this disruption is occurring, the "resistance" differs because the airflow path to air handler 253 is different.

When HVAC system 250 is not in operation, ducts 361 and 362 act as a pipe or wave guide. Significant airflow produced in the space flows through the ductwork. Although small movements might not generate enough airflow, the movements of large surfaces, such as doors, can produce detectable amounts of airflow through air handler 253. Thus, there are opportunities to detect certain movement in the space when HVAC system 250 is in operation and also when HVAC system 250 is not in operation.

In various embodiments, sensing device 110 (FIG. 1) is configured to couple to air filter 252 of HVAC system 250 in FIG. 2. Air filter 252 can include: (a) a fibrous material 274; and (b) an outer frame 276. Air filter 252 can also have a first side 257 through which an air flow enters fibrous material 274 and a second side 258 opposite first side 257 and through which the air flow exits fibrous material 274. In some examples, sensor unit 130 can be disposed proximate to or coupled to first side 257, and sensor unit 131 be disposed proximate to or coupled to the second side 258. In the same or different example, fibrous material can be replaced with a metallic mesh or screen, particularly when air filter 252 is an electrostatic air filter.

In some examples, sensing device 110 can use coupling device 132 (FIG. 1) to couple to air filter 252 (FIG. 2). In some examples, coupling device 132 can include complementary magnets where a first magnet is attached to sensor unit 130 and a second magnet is coupled to sensor unit 131. The magnetic force between the magnets can be used to hold sensor unit 130 and the first magnet to first side 257 and sensor unit 131 and the second magnet to second side 258.

In other examples, coupling device 132 can be a C-shaped housing 275 (FIG. 2) with sensor units 130 and 131 located at opposite ends of the housing. The C-shaped housing 275 can be configured such that C-shaped housing 275 can couple to air filter 252 where a first end with sensor unit 130 is located at first side 257 and a second end with sensor unit 131 is located at second side 258.

In other examples, a single differential pressure sensor also would be appropriate. However, using two pressure sensors allows easier placement of the pressure sensor because an air tube would have to be routed through or around air filter 252 to allow the single differential pressure sensor to obtain pressure readings on both sides 257 and 258 of air filter 252.

In some examples, air filter 252 is used as the sensing point for two reasons. First, air filter 252 can be located between the return vents 251 and, in some examples, near blower 259, making it a good place for recording the static pressure changes. Second, air filter 252 typically has the easiest access to the air handler 253, making it potentially easier to deploy for installers and end-users. Coupling sensing device 110 to air filter 253 (or blower 259) can be considered to be placing sensing device 110 in the ductwork of HVAC system 250.

Referring again to FIG. 1, computational unit 120 is configured to use the two or more pressure measurements from sensor units 130 and 131 to determine when one or more movement events have occurred. Computational unit 120 can include: (a) transceiver or receiver 121; (b) a processing module 122; and (c) storage module 126. As an example, processing module 122 can be one or more software programs. In some examples, processing module 122 can include: (a) a training module 123 configured to correlate events with changes in the total static pressure; (b) an event detection module 124 configured to use the two or more pressure measurements to identify changes in the total static pressure; and (c) a communications module 125 configured to communicate with a user. Receiver 121 can be configured to receive at least one of the temperature-compensated pressure and/or the raw pressure and temperature measurements from transmitter 116.

"Computational Unit 120," as used herein, can refer to a single computer, single server, or a cluster or collection of computers and/or servers. In some examples, computational unit 120 can be local to the user. In other examples, the user can access computational unit 120 through the Internet or other networks.

In some examples, computational unit 120 can be a home computer of the user of motion detection device 100 or a computer owned or controlled by the owner of the building in which motion detection device 100 is installed. In other examples, a first server or computer (e.g., a home computer) can include a first portion of receiver 121, storage module 126, training module 123, event detection module 124, and communications module 125. One or more second servers (e.g., a computer or server owned or controlled by the manufacturer of motion detection device 100 or a utility company or a security monitoring company) can include a second, possibly overlapping, portion of these modules. In these examples, computational unit 120 can comprise the combination of the first computer and the one or more second servers. In some examples, storage module 126 can store the correlation information between changes in the static pressure and specific movement events.

Event detection module 124 can determine the static air pressure by calculating the differential ($\Delta P$) between the pressure measurement at sensor units 130 and 131 located at sides 257 and 258, respectively, of air filter 252 (FIG. 2). In many embodiments, event detection module 124 can detect this phenomenon by first looking for a significant change in the static pressure in the pressure measurements from sensor units 130 and 131. For example, event detection module 124 can compare the average of the five previous pressure differential readings with the current pressure differential measurement to attempt to detect a change in the total static pressure. When there is a pressure change greater than a predetermined or threshold amount (e.g., 10 mbar), event detection module 124 can record the subsequent pressure values for further processing until there are no more changes for a predetermined amount of time (e.g., 4,000 milliseconds). In some examples, a 10 mbar threshold change is used to avoid detecting any slight variations in HVAC fan speed from sensor units 130 and/or 131 or noise from analog-to-digital converter(s) inside sensor units 130 and 131.

From the recorded data, event detection module 124 can extract the initial pressure value, the initial maximum pressure change, and the resulting final stable pressure. These features are extracted from the pressure measurements of sensor units 130 and 131 and produce a final feature vector of three components, which can be used in event classification (described in detail below).

Figure 4:
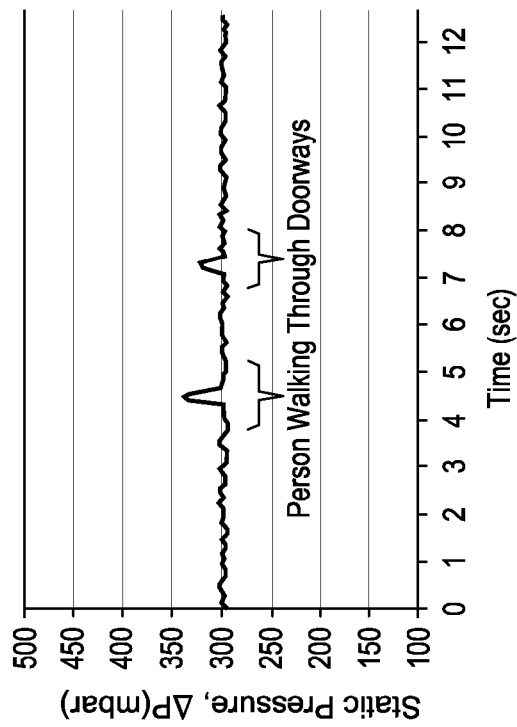
FIG. 4 shows a graph of the change in static pressure versus time as a door is opened and closed, according to an embodiment.

For example, FIG. 4 shows a graph 400 of the change in static pressure versus time as a door is opened and closed. As illustrated in FIG. 4, there is an initial spike in the static pressure followed by a flattening as the door is closed. After the door is reopened, the pressure returns to the previous state. That is, two important features characterize door opening and closing events in the pressure measurements of sensor units 130 and 131. When a door is closed, there is first an initial abrupt change in static pressure (i.e., a change in $\Delta P$) followed by persistent change until the door is reopened. After opening the door, the static pressure gradually drops to the previous state.

Figure 5:
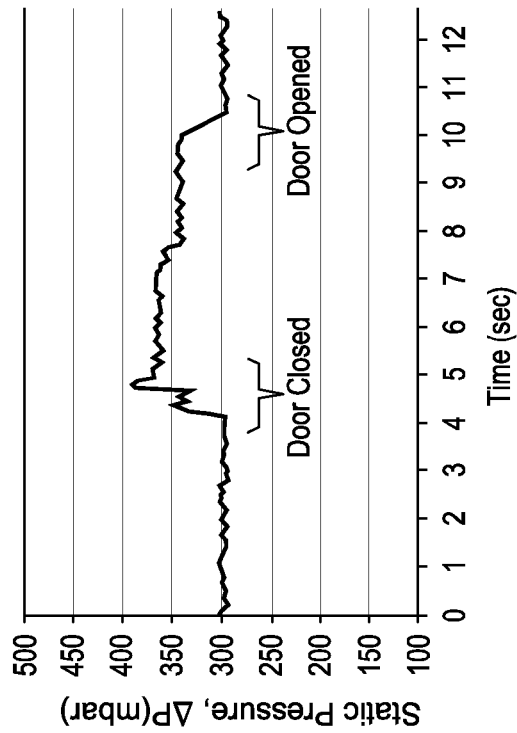
FIG. 5 shows a graph of the change in static pressure versus time as people walk through a doorway, according to an embodiment.

In another example, FIG. 5 shows a graph 500 of the change in static pressure versus time as people walk through a doorway. Like opening and closing of door events, variations in the static pressure occur as individuals moved through various doorways. A person passing through a doorway, however, is a brief event, and unlike the door events, the changes in pressure are very short-lived. As shown in FIG. 5, usually there is a slight change in the static pressure, and then the pressure settles back to its original state. The size of the change in static pressure can be dependent on the location of the supply and return vents relative to the doorway and the ratio of the size of the person to the size of the doorway. In some implementations of motion detecting device 100, observations showed that three out of four people passing through a door events resulted in detectable airflow disruptions (e.g., a change in static pressure of greater than ten millibars).

When HVAC system 250 is not operating, there is no static pressure build-up in air handler 253. Instead, the pressure is equal to the atmospheric pressure of approximately one bar. Any significant airflow generated in the conditioned space is guided through either ducts 361 and 362 (FIG. 3) and eventually reaches the sensor units 130 and 131 (FIG. 2). The sensitivity of sensor units 130 and 131 make it possible to detect this airflow reaching sensor units 130 and 131.

When HVAC system 250 is off, event detection module 124 (FIG. 1) can use the same or a similar method as when HVAC is on to determine when a movement event has occurred. Furthermore, when HVAC is off, event detection module 124 can use the pressure measurement from both sides of air filter 252 to help determine where the airflow originated.

It is also possible for event detection module 124 to detect airflow caused by people moving near an air vent and by other devices, such as a ceiling or desk fan. These movement events produce very small amounts of airflow and thus, require more expensive, high-resolution, and low-noise pressure sensors.

Training module 123 (FIG. 1) can be configured to correlate specific changes in pressure with specific events at specific locations. For example, training module 123 can be configured to determine that the movement event shown in FIG. 4 is the closing and opening of door leading into the master bedroom from the master bathroom.

In some examples, training module 123 can be configured to perform a training or calibration sequence to correlate changes in static pressure with specific movement events at specific locations. After performance of the calibration sequence, training module can provide the training correlation data to event detection module 124 so event detection module 124 correlate the changes in static pressure with specific movement events at specific locations. Specific training or calibration sequences are described in relation to activity 920 of method 900 in FIG. 9.

Communications module 125 (FIG. 1) can be used to communicate and receive information to one or more users of motion detecting device 100. For example, a user can use communications module 125 to enter information during a training or calibration sequence. Additionally, communications module 125 can inform a user when a movement event occurs. In some embodiments, communications module 125 can use monitor 1606, keyboard 1604, and/or mouse 1610 of FIG. 16.

Figure 6:
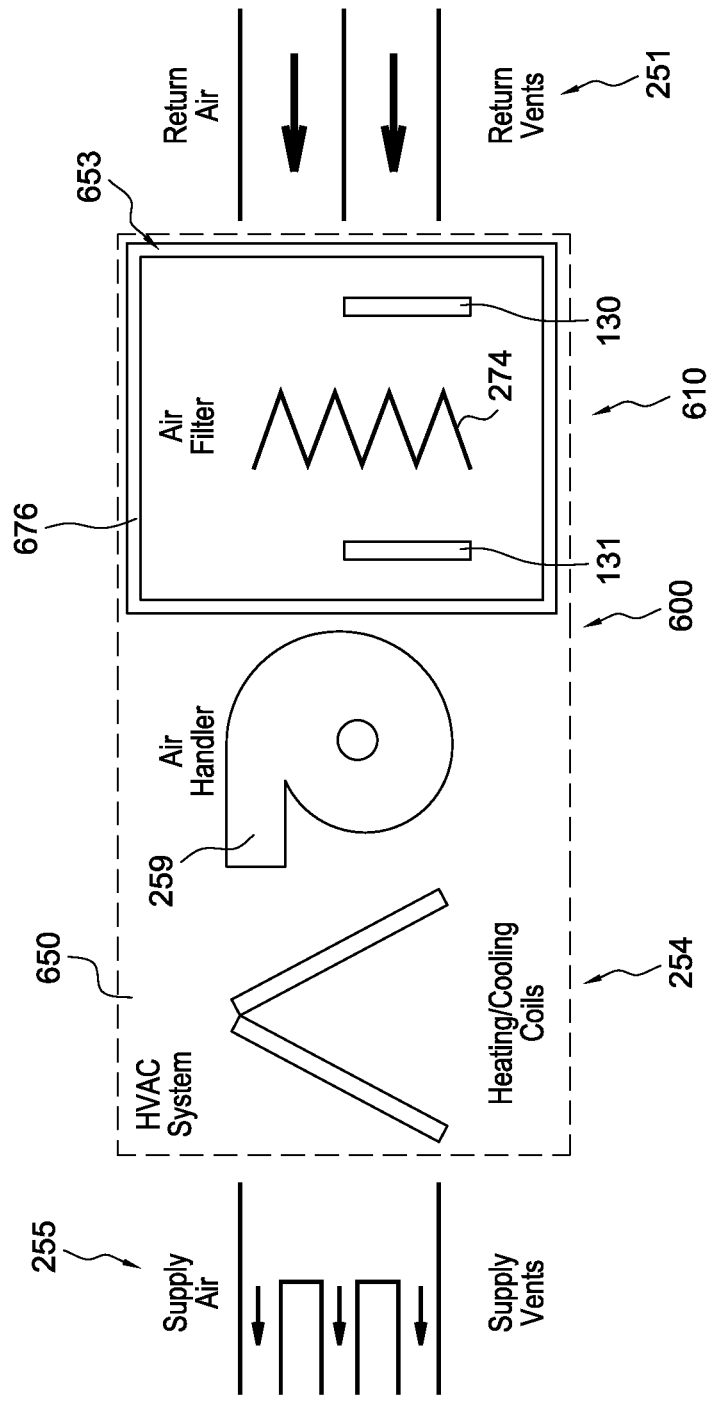
FIG. 6 illustrates an implementation of a sensing device of a motion detecting device in an exemplary HVAC system, according to a second embodiment.

Turning to another embodiment, FIG. 6 illustrates an implementation of sensing device 610 of a motion detecting device 600 in an exemplary HVAC system 650, according to a second embodiment. Motion detecting device 600 is merely exemplary and is not limited to the embodiments presented herein. Motion detecting device 600 can be employed in many different embodiments or examples not specifically depicted or described herein. For example, motion detecting device 600 can be deployed in HVAC systems in a commercial or residential setting not specifically depicted or described herein.

In this example, motion detecting device 600 can include: (a) sensing device 610; and (b) computational unit 120 (FIG. 1). Sensing device 610 can be part of air filter 653. For example, air filter 653 can include: (a) filter and/or fibrous material 274; (b) an outer frame 676 located around fibrous material 274; (c) at least one sensor unit 130 and 131 coupled to at least one of fibrous material 274 or outer frame 676; (c) a transmitter 116 (FIG. 1) electrically coupled to the sensor units 130 and 131; (d) power source 117 (FIG. 1); and (e) controller 118 (FIG. 1). In this embodiment, at least one sensor unit 130 and 131 can be integral with air filter 653. In some examples, air filter 653 is removable from HVAC system 650, and/or fibrous material 274 is replaced with a wire mesh or screen. Other components of sensing device 610 can be similar to sensing device 110 (FIG. 1), and also can be part of air filter 653. In the same or different embodiment, computational unit 120 can be part of or separate from air filter 653. In some examples, the combination of sensing device 610 and air filter 653 can be considered a smart air filter, as opposed to sensing device 110 (FIG. 1), which can be considered, in some examples, to be a retrofit to HVAC system 250 (FIG. 2).

Figure 7:
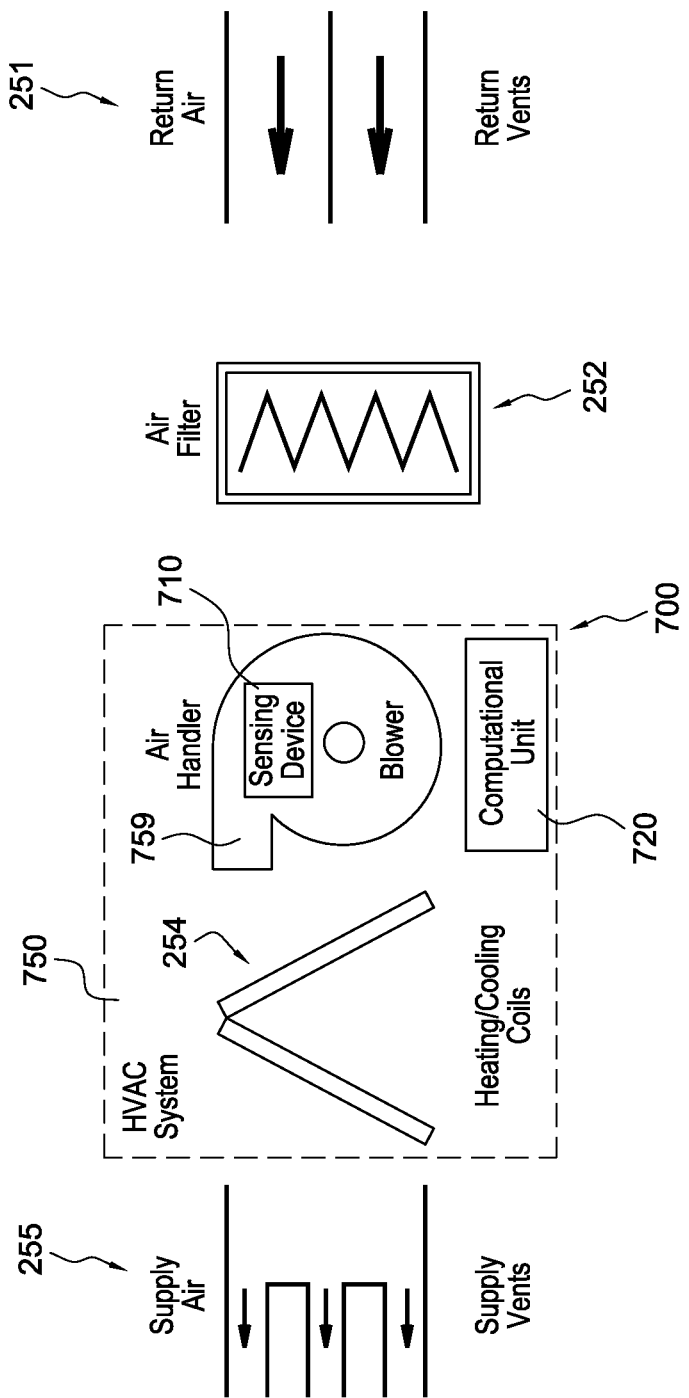
FIG. 7 illustrates an implementation of a sensing device of a motion detecting device in an exemplary HVAC system, according to a third embodiment.

Turning to yet still another embodiment, FIG. 7 illustrates an implementation of sensing device 710 of a motion detecting device 700 in an exemplary HVAC system 750, according to a third embodiment. Motion detecting device 700 is merely exemplary and is not limited to the embodiments presented herein. Motion detecting device 700 can be employed in many different embodiments or examples not specifically depicted or described herein. For example, motion detecting device 700 can be deployed in HVAC systems in a commercial or residential setting not specifically depicted or described herein.

In this example, motion detecting device 700 can include: (a) sensing device 710; and (b) computational unit 720. Sensing device 710 could be integrally and/or permanently part of a HVAC system. For example, sensing device 710 (or sensor units 130 and/or 131) can be located at or in blower 759. In some embodiments, computational unit 720 can be also located inside HVAC system 750 (e.g., inside large, non-permanently sealed box 363 (FIG. 3)). In some examples, sensing device 710 and computational unit 720 can be similar to sensing device 110 (minus coupling device 132 (FIG. 1)) and computational unit 120, respectively.

FIG. 8 illustrates a flow chart for an embodiment of a method 800 of providing a motion sensor, according to an embodiment. Method 800 is merely exemplary and is not limited to the embodiments presented herein. Method 800 can be employed in many different embodiments or examples not specifically depicted or described herein. In some embodiments, the activities, the procedures, and/or the processes of method 800 can be performed in the order presented. In other embodiments, the activities, the procedures, and/or the processes of the method 800 can be performed in any other suitable order. In still other embodiments, one or more of the activities, the procedures, and/or the processes in method 800 can be combined.

Method 800 of FIG. 8 includes an activity 810 of providing one or more pressure sensors configured to provide two or more pressure measurements. As an example, the one or more pressure sensors can be similar or identical to pressure sensors 112 and/or 114 or sensor units 130 and/or 131 of FIG. 1.

Method 800 in FIG. 8 continues with an activity 815 of providing a transmitter. As an example, the transmitter can be similar or identical to transmitter 116 of FIG. 1.

Subsequently, method 800 of FIG. 8 includes an activity 820 of providing a controller. As an example, the controller can be similar or identical to controller 118 of FIG. 1.

Next, method 800 of FIG. 8 includes an activity 825 of electrically coupling the one or more pressure sensors to the controller and the one or more pressure sensors. For example, the one or more pressure sensors can be electrically coupled to the controller and the one or more pressure sensors in a manner similar or identical to the electrical coupling of sensor units 130 and 131 to controller 118 and to sensor units 130 and 131, as illustrated in FIG. 1.

Method 800 in FIG. 8 continues with an activity 830 of electrically coupling the transmitter to the controller and the one or more pressure sensors. For example, the transmitter can be electrically coupled to the controller in a manner similar or identical to the electrical coupling of transmitter 116 to controller 118, as illustrated in FIG. 1.

Subsequently, method 800 of FIG. 8 includes an activity 835 of providing a body. In some examples, the body can be identical or similar to C-shaped housing 275 of FIG. 2, box 363 of FIG. 3, or air filter 653 of FIG. 6.

Next, method 800 of FIG. 8 includes an activity 840 of mechanically coupling the one or more pressure sensors, the transmitter, and the controller to the body.

Method 800 in FIG. 8 continues with an activity 845 of providing a computational unit. In some examples, the computational unit can include: (a) a receiver; (b) an event detection module configured to use the two or more pressure measurements to determine when one or more movement events have occurred; and (c) a training module configured to determine a relationship between the two or more pressure measurements and the one or more movement events. As an example, the computational unit can be similar or identical to computational unit 120 of FIG. 1. The receiver, the event detection module, and the training module can be similar or identical to receiver 121, event detection module 124, and training module 123 of FIG. 1, respectively.

FIG. 9 illustrates a flow chart for an embodiment of a method 900 of detecting movement, according to an embodiment. Method 900 is merely exemplary and is not limited to the embodiments presented herein. Method 900 can be employed in many different embodiments or examples not specifically depicted or described herein. In some embodiments, the activities, the procedures, and the processes of method 900 can be performed in the order presented. In other embodiments, the activities, the procedures, and the processes of the method 900 can be performed in any other suitable order. In still other embodiments, one or more of the activities, the procedures, and the processes in method 900 can be combined. In yet further examples, one or more of the activities, the procedures, and the processes in method 900 can be combined with one or more of the activities, the procedures, and the processes in method 800 of FIG. 8.

Method 900 of FIG. 9 includes an activity 910 of receiving first pressure data in one or more pressure sensors. As an example, the one or more pressure sensors can be similar or identical to pressure sensors 112 and 114 or sensor units 130 and 131 of FIG. 1.

Method 900 in FIG. 9 continues with an activity 915 of transmitting the first pressure data to a first computational unit. In some examples, a transmitter can wireless transmit electrical signals using WI-FI, the Bluetooth 3.0+HS wireless protocol, Zigbee, Z-Wave, or a cellular network. In other examples, the transmitter can transmit the first pressure data over a wired connection.

Subsequently, method 900 of FIG. 9 includes an activity 920 of using the first pressure data to train the first computational unit to correlate the first pressure data to one or more specific movement events. In some examples, training module 123 (FIG. 1) can perform a training or calibration process with a user.

Referring back to FIG. 1, in various embodiments, the calibration process can involve a labeling process where a user of motion detecting device 100 helps relate changes in static pressure to specific movement events at specific locations. In some embodiments, the training sequence involves a user of motion detecting device 100 walking through the house or building while training module 123 is operating and recording movement events.

After walking through the house or building, the user can label each movement event detected by training module 123 using communications module 125. For example, if the user started in a main hallway and walked: (1) through a first doorway from the main hallway into a family room and (2) from the family room into the kitchen though a second doorway, a first movement event detect by motion detecting device 100 can be labeled as person walking from the main hallway into a family room, and a second movement event detected by motion detecting device 100 can be labeled as a person walking from the family room into the kitchen though a second doorway. Similarly, a user can open and close all of the doors in the housing or building and perform a similar labeling procedure.

In other examples, communications module 125 can include a portion that can run on a mobile electrical device (e.g., an iPhone® device by Apple Computers, Inc. of Cupertino, Calif.) that allows a user to mark or timestamp when a specific movement event occurred. In these examples, a user could walk through the house or building while carrying the electrical device running the part of communications module 125 and use communications module 125 to mark when a movement event occurred.

For example, while training module 123 is operating and recording movement events, the user can walk through a first doorway from a main hallway into a family room and press a button on the mobile electrical device that causes the electrical device to record the description of the movement event and the time that event occurred. Training module 123 can correlate the data recorded by the mobile electrical device and the static pressure changes detected by sensing devices 110 and 112 to relate changes in static pressure to specific movement events at specific locations. In some examples, the mobile electrical device can relay the data immediately (e.g., in real time) to computational unit 120, and in other examples, the data can be communicated to computational unit 120 after the training process is complete (e.g., in batch mode).

In some embodiments, the user will have to perform the training process twice, once with the HVAC system on and once with the HVAC system off. In the same or different embodiments, the training process can be performed multiple times to increase the accuracy of the results of the training process.

Referring again to FIG. 9, method 900 of FIG. 9 includes an activity 925 of receiving second pressure data from the one or more pressure sensors. In some examples, activity 925 can be similar or identical to activity 910.

Method 900 in FIG. 9 continues with an activity 930 of transmitting the second pressure data to the first computational unit. In some examples, activity 930 can be similar or identical to activity 915.

Subsequently, method 900 of FIG. 9 includes an activity 935 of correlating the second pressure data to a first event of the one or more specific movement events. Referring again to FIG. 1, to classify events, event detection module 124 can use the training data. That is, event detection module 124 can use a method of matching movement events with the movement events recording during the training process. For example, every time a specific door is opened or a person walks a specific doorway, the static pressure signature of the movement event will be substantially the same. Accordingly, event detection module 124 can match a static pressure signature of the just occurred movement event with the static pressure signature of the training process to identify the just occurred movement event.

To classify events, event detection module 124 can use a support vector machine (SVM) models in some embodiments. SVM models perform classification by constructing an N-dimensional hyperplane that optimally separates the data into multiple categories. The separation is chosen to have the largest distance from the hyperplane to the nearest positive and negative examples. Thus, the classification is appropriate for testing data that is near, but not identical, to the training data as is the case for the feature vectors in this embodiment. In addition, SVMs can automatically determine the appropriate kernel type based on the data build characteristics, so kernels beyond linear functions can be factored into the determination. For example, three different SVM models can be used for each of the three scenarios (e.g., opening and closing of doors while the HVAC is in operation, adults moving through doorways while the HVAC is in operation, and the opening and closing of doors while the HVAC is not in operation), using their respective feature vectors with each transition event labeled as the class.

In the same or different example, a map or diagram of the home or building can be imported or loaded into computational unit 120. The training module (such as training module 123 in FIG. 1) can use the map or diagram to help identify the event. For example, event detection module 124 determines that a person just walked into a first room and then determines a second movement event occurred. After performing the matching process, event detection module 124 determines the second movement event is most likely one of a person walking into one of two rooms. According to the map of the house, one of the rooms is adjacent to the first room in which the person just walked and the other room is at the other side of the building. In this case, event detection module 124 can reasonably conclude using information from the map or diagram of the building, it is most likely that the person just walked into the room adjacent to the first room.

Referring again to FIG. 9, method 900 of FIG. 9 includes an activity 940 of displaying information regarding the first event to a user. In some examples, communications module 125 (FIG. 1) can inform a user when a movement event occurs or provide information about two or more movement events. In some embodiments, communications module 125 (FIG. 1) can use monitor 1606, keyboard 1604, and/or mouse 1610 of FIG. 16.

In other examples, communications module 125 can provide the information to other systems. For example, the information can be provided to a system that controls the HVAC system for use in, for example, turning on or off the HVAC system in parts of the home or building (e.g., zone heating and cooling). In another example, the information about specific events can be provided to an alarm system. In yet another embodiment, the information about specific movement events can be provided to a system that monitors and controls electricity usage in the home or building. In further embodiments, the information can be provided to a system that controls the lights and other electrical outlets. In this embodiment, the information can be used, for example, to turn on lights and other electrical appliances in the room the person just entered and to turn off the lights and other electrical appliances in the room the person just exited.

Several feasibility experiments were performed as part of the development of embodiments of motion detecting device 100 and methods 800 and 900. The goal of these feasibility experiments was to determine if and how often motion detecting device 100 could detect movement events (e.g., adults walking through doorways and the opening and closing of doors) and how accurately motion detecting device 100 could classify unique movement events.

In this section, results are presented from these experiments in four different homes for the following three conditions: (a) opening and closing of doors while the HVAC is in operation, (b) adults moving through doorways while the HVAC is in operation, and (c) the opening and closing of doors while the HVAC is not in operation.

Observations were conducted in four different homes for a period ranging from three to four weeks (see Table 1 in FIG. 10 for information about the homes). Home 1 and Home 2 were fairly large homes, with Home 1 having three separate central HVAC units, and Home 2 having two separate central HVAC units. All three units in Home 1 and one unit in Home 2 were instrumented with an embodiment of motion detecting device 100 in FIG. 1. Homes 3 and 4 were smaller apartments with a single, central HVAC system. Thus, a total of six different spaces and HVAC units were evaluated. For each HVAC unit, an embodiment of motion detecting device 100 was installed at the air filter. Five pressure sensors were securely attached to an air filter prevent any movement from the airflow. The sensing device was coupled to a computation device with cables. Cables were run around the edge of the air filter to prevent them from being drawn in to the fan assembly. Finally, the cables were connected to a computational unit (e.g., a laptop) placed near the HVAC system.

Two techniques for obtaining labeled training data were used. First, throughout the 3-4 week period while the houses were in a closed and sealed state (windows and exterior doors closed), numerous door close and open events, and a person walking through doorways events were manually labeled. Second, data was captured for a longer time period using traditional motion sensors placed at various locations in the house. The traditional motion sensors were placed on both sides of the top of the doorways (facing downwards) to detected movement events and the direction of movement through the door. These motion sensors allowed determination of any movement events that occurred at various times during the day. The large dataset created allowed portioning of the data into training and test sets.

In these experiments, the feasibility of accurately classifying the various kinds of movement events in a quasi-controlled manner was tested. For all four homes, sensor readings were manually labeled for each event using a remote handheld computer wirelessly connected to the computational unit. Accurately labeling the sensor readings for each of the five sensors after triggering the various events was found to be possible. The method described above (e.g., activity 935 of FIG. 9), were used to construct the appropriate feature vectors to feed the classifier data. For these experiments, all interior doors of interest were kept in the open position (90 degrees from the opening), and then each of such doors were manually and sequentially or individually opened and closed. For the human movement experiments, the same individual triggered those events. Twenty-five instances for each of the doorway events were collected at three different times during the 3-4 week period.

Table 2 in FIG. 11 shows the classification accuracies of all the spaces. A sample confusion matrix is also included in Table 3 of FIG. 12. It is clear that door transition movement events were more accurately detected than people transition movement events. However, the overall accuracy of classifying unique movement events was around 65%. Door events were classified correctly on an average of 75-80% of the time. Both of these events can be combined to provide good predictions on the location or movement of people through the space. Some of the low classification accuracies, such as from Floor 2 in Home 1, were attributed to the lack of doors and doorways and that the space in Floor 2 of Home 1 was very open with the air vent a significant distance away from the interior doors. The results of the HVAC off experiment are also shown in Table 4 of FIG. 13. The higher performance came in smaller spaces where the vents tended to be closer to the doorway and also came in spaces where there were many vents, such as Homes 1 and 2.

For the long-term deployment, more in-situ or "more natural" data on the various events occurring in the home was collected, and this data provided some initial long-term in-situ results. For labeling, motion sensors placed at various doorways were used to determine any door movement or motion through the doorway and matched up those events with the corresponding sensor values from the HVAC system.

Two analyses were conducted: (a) one was the percentage of time motion detecting device 100 was able to determine particular events; and (b) the second were to determine the classification accuracies of detecting unique events. Table 5 of FIG. 14 shows the number of events that were detected by motion detecting device 100, either as a door transition event or a human movement through the doorway, for each of the four homes. The results for two cases are presented: one is with the HVAC system in operation and the other is with the HVAC system off.

The results show that a larger percentage of events were detected with the HVAC system in operation than with the HVAC system in the off state. The reason for the lower percentage for the HVAC system off state was because of the location of the return and supply vents. In some cases, the vents were not close enough to a door for the airflow to reach the sensing units, which was also observed in the controlled experiment. The smaller spaces and the spaces with many doorways actually resulted in a higher number of detectable events. This characteristic is attributed to the greater number of vents and the likelihood that the doorways were near vents. The results with the HVAC system in operation showed almost 80% of the events being detected when compared to the traditional motion sensors.

Table 6 of FIG. 15 shows the results of classifying unique events in the house. The SVM classification scheme was applied to the entire in situ dataset for each of the 4 homes (6 spaces). This dataset included events from all three of the possible conditions (door open/close with HVAC on and off and human movement with HVAC on). The triggering of the motion sensor was used to provide the location label to the air pressure data collected by our sensing system. Because the type of event was not known, the signal response was used to determine the event (i.e., person or door).

The accuracy of motion detecting device 100 is shown using 10-fold cross validation across the entire data set. Compared to the first controlled experiments, the overall accuracy on average is 15-20% lower. However, given that no control existed over the various other events occurring during that same time, the results still showed classification accuracies between 60-70%. From this data, it is clear the status of other doors in the home did not have a large impact on the classification accuracy of detecting door transitions with the HVAC system off. The larger difference while the HVAC system is in operation compared to the controlled experiment does indicate that the door states have an impact on the pressure differentials, as expected.

Figure 16:
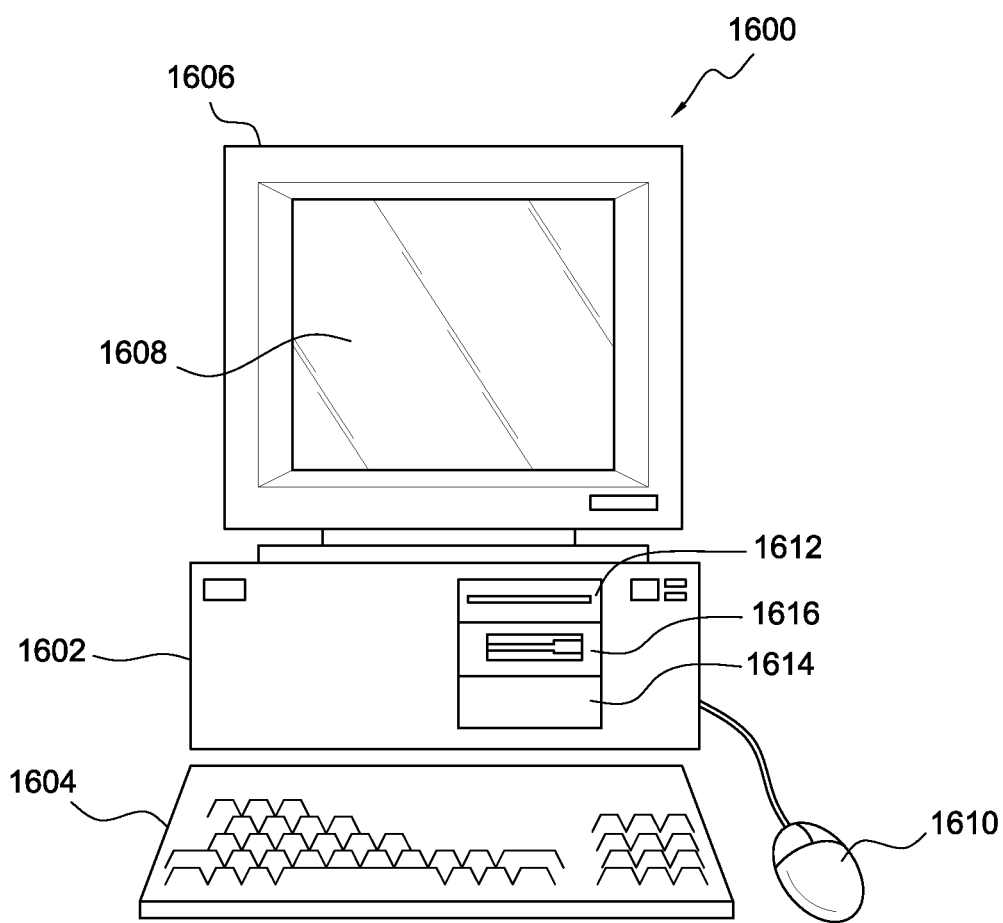
FIG. 16 illustrates a computer that is suitable for implementing an embodiment of computer system of FIG. 1.
Figure 17:
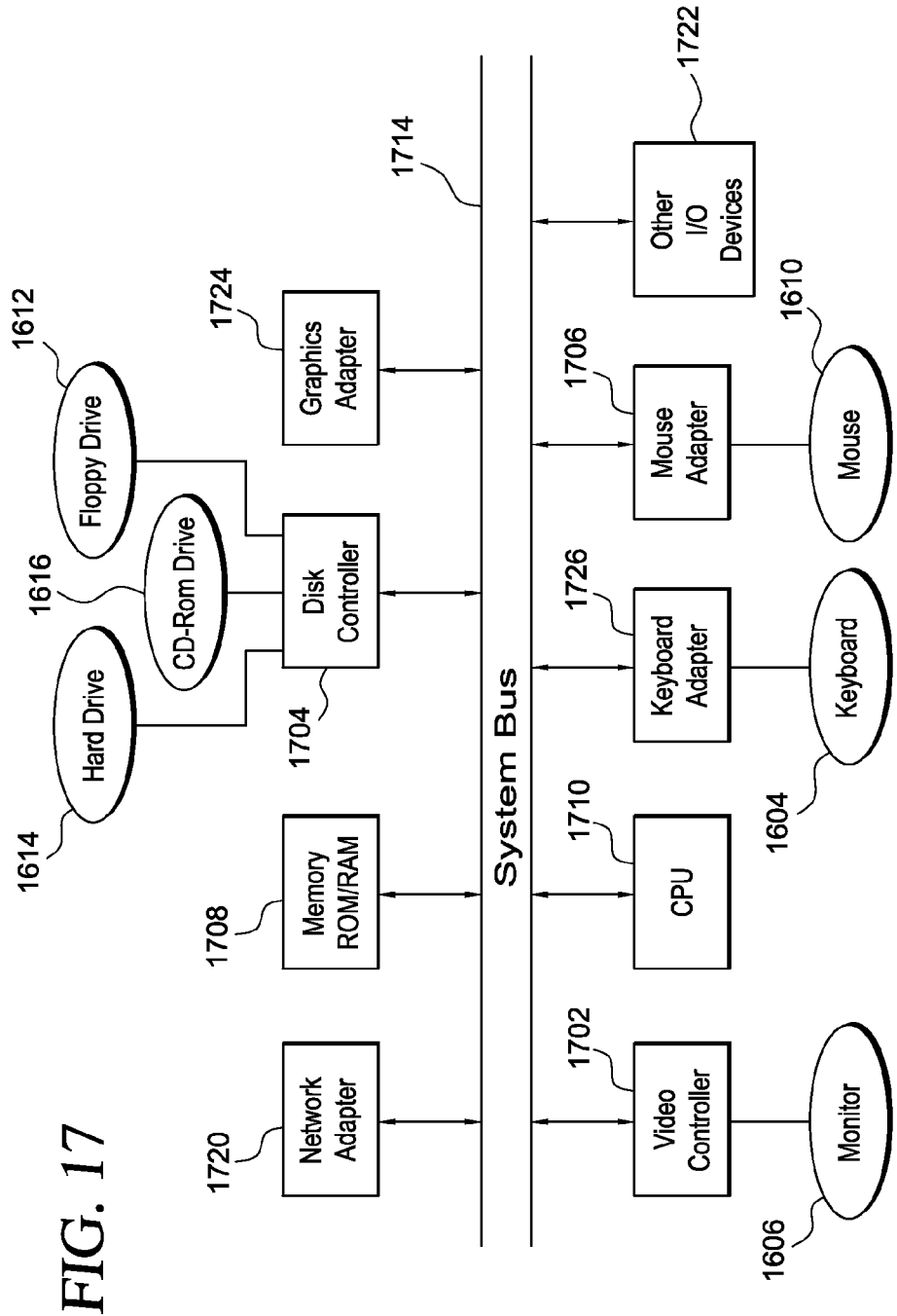
FIG. 17 illustrates a representative block diagram of an example of the elements included in the circuit boards inside chassis of the computer of FIG. 16.

FIG. 16 illustrates a computer 1600 that is suitable for implementing an embodiment of at least a portion of processing module 122 (FIG. 1). Computer 1600 includes a chassis 1602 containing one or more circuit boards (not shown), a floppy drive 1612, a Compact Disc Read-Only Memory (CD-ROM) and/or Digital Video Disc (DVD) drive 1616, and a hard drive 1614. A representative block diagram of the elements included on the circuit boards inside chassis 1602 is shown in FIG. 17. A central processing unit (CPU) 1710 in FIG. 17 is coupled to a system bus 1714 in FIG. 17. In various embodiments, the architecture of CPU 1710 can be compliant with any of a variety of commercially distributed architecture families including the ARM (advanced RISC (reduced instruction set) computing machine), MIPS (microprocessor without interlocked pipeline stages), RS/6000 family, the Motorola 68000 family, or the Intel x86 family.

System bus 1714 also is coupled to memory 1708 that includes both read only memory (ROM) and random access memory (RAM). Non-volatile portions of memory 1708 or the ROM can be encoded with a boot code sequence suitable for restoring computer 1600 (FIG. 16) to a functional state after a system reset. In addition, memory 1708 can include microcode such as a Basic Input-Output System (BIOS). In some examples, memory 1708 can include floppy drive 1612, hard drive 1614, and/or CD-ROM or DVD drive 1616 storage module 126 (FIG. 1).

In the depicted embodiment of FIG. 17, various I/O devices such as a disk controller 1704, a graphics adapter 1724, a video controller 1702, a keyboard adapter 1726, a mouse adapter 1706, a network adapter 1720, and other I/O devices 1722 can be coupled to system bus 1714. Keyboard adapter 1726 and mouse adapter 1706 are coupled to keyboard 1604 (FIGS. 16 and 17) and mouse 1610 (FIGS. 16 and 17), respectively, of computer 1600 (FIG. 16). While graphics adapter 1724 and video controller 1702 are indicated as distinct units in FIG. 17, video controller 1702 can be integrated into graphics adapter 1724, or vice versa in other embodiments. Video controller 1702 is suitable for refreshing a monitor 1606 (FIGS. 16 and 17) to display images on a screen 1608 (FIG. 16) of computer 1600 (FIG. 16). Disk controller 1704 can control hard drive 1614 (FIGS. 16 and 17), floppy disc drive 1612 (FIGS. 16 and 17), and CD-ROM or DVD drive 1616 (FIGS. 16 and 17). In other embodiments, distinct units can be used to control each of these devices separately.

Although many other components of computer 1600 (FIG. 16) are not shown, such components and their interconnection are well known to those of ordinary skill in the art. Accordingly, further details concerning the construction and composition of computer 1600 and the circuit boards inside chassis 1602 (FIG. 16) need not be discussed herein.

When computer 1600 in FIG. 16 is running, program instructions stored on a floppy disc in floppy disc drive 1612, on a CD-ROM or DVD in CD-ROM and/or DVD drive 1616, on hard drive 1614, or in memory 1708 (FIG. 17) are executed by CPU 1710 (FIG. 17). A portion of the program instructions, stored on these devices, can be suitable for carrying out at least part of method 900 (FIG. 9).

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that a sensing device can include any number of sensor units, and that activities 810, 815, 820, 825, 830, 835, 840, and 845 of FIG. 8, activities 910, 915, 920, 925, 930, 935, and 940 of FIG. 9 or any element of FIG. 1, 6 and/or 7 may be comprised of many different activities, procedures and be performed by many different modules, in many different orders and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A motion detecting device configured to detect whether one or more movement events by at least one person, animal, door, or window have occurred, the motion detecting device comprises:

a processing module configured to run on a computational unit; and a sensing device comprising:

one or more pressure sensors configured to provide two or more pressure measurements; and a transmitter electrically coupled to the one or more pressure sensors and configured to transmit the two or more pressure measurements to the computational unit, wherein:

the processing module is configured to use the two or more pressure measurements to determine whether the one or more movement events by the at least one person, animal, door, or window have occurred;
the sensing device is configured to be placed in at least one of ductwork of a heating, ventilation, and air conditioning system or an air handler of the heating, ventilation, and air conditioning system;
the processing module comprises:
  a training module; and
  an event detection module;
the training module is configured to correlate a first event of the one or more movement events with a first change in pressure and a second event of the one or more movement events with a second change in pressure; and
the event detection module is configured to use the two or more pressure measurements to identify a third event of the one or more movement events.

2. The motion detecting device of claim 1, further comprising:
a wire,
wherein:
  the computational unit comprises a receiver;
  the receiver of the computational unit is electrically coupled to the transmitter of the sensing device using the wire and is configured to receive the two or more pressure measurements over the wire.

3. The motion detecting device of claim 1, wherein:
the transmitter comprises a wireless transmitter; and
the computational unit comprises:
  a wireless receiver configured to receive the two or more pressure measurements from the wireless transmitter.

4. The motion detecting device of claim 1, wherein:
one or more pressure sensors are configured to provide a first pressure measurement at a first time, a second pressure measurement at a second time, and a third pressure measurement at a third time;
the first time is before the second time and the third time;
the second time is before the third time; and
the two or more pressure measurements comprise the first pressure measurement, the second pressure measurement, and the third pressure measurement.

5. The motion detecting device of claim 4, wherein:
the processing module is configured to determine an occurrence of the one or more movement events by the at least one person, animal, door, or window at least in part by comparing the first pressure measurement, the second pressure measurement, and the third pressure measurement.

6. The motion detecting device of claim 1, wherein:
the sensing device is configured to be disposed proximate to an air filter.

7. The motion detecting device of claim 6, wherein:
the air filter comprises:
  a first side through which an air flow enters the air filter; and
  a second side opposite the first side and through which the air flow exits the air filter; and
the one or more pressure sensors comprise:
  a first pressure sensor disposed proximate to the first side of the air filter; and
  a second pressure sensor disposed proximate to the second side of the air filter.

8. The motion detecting device of claim 7, wherein:
the first pressure sensor of the one or more pressure sensors is configured to provide a first pressure measurement at substantially a first time; and
the second pressure sensor of the one or more pressure sensors is configured to provide a second pressure measurement at substantially the first time.

9. The motion detecting device of claim 1, wherein:
the processing module comprises:
  a communications module configured to communicate to a user.

10. The motion detecting device of claim 1, wherein:
the sensing device further comprises:
  one or more temperature sensors; and
the sensing device is configured such that the one or more temperature sensors measure at least one temperature at the one or more pressure sensors; and
the transmitter is electrically coupled to the one or more temperature sensors and is configured to transmit the at least one temperature at the one or more pressure sensors to the computational unit.

11. The motion detecting device of claim 1, wherein:
the sensing device further comprises:
  a controller; and
  one or more temperature sensors;
the sensing device is configured such that the one or more temperature sensors measure at least one temperature at the one or more pressure sensors; and
the controller is configured to calculate a temperature-compensated pressure value for each of the two or more pressure measurements using the at least one temperature at the one or more pressure sensors.

12. A method of detecting movement by at least one person, animal, door, or window, the method comprising:
training a movement detection system;
performing two or more first measurements of air pressure in a duct of a heating, ventilation, and air conditioning system;
transmitting the two or more first measurements of the air pressure;
determining one or more first changes of the air pressure based on the two or more first measurements of the air pressure; and
using results of the training the movement detection system to associate at least one of the one or more first changes of the air pressure with a first movement event by the at least one person, animal, door, or window;
wherein:
  training the movement detection system comprises:
    performing two or more second measurements of the air pressure in the duct of the heating, ventilation, and air conditioning system;
    determining one or more second changes of the air pressure based on the two or more second measurements of the air pressure; and
    correlating the one or more second changes of the air pressure with one or more second movement events by the at least one person, animal, door, or window.

13. The method of claim 12, further comprising:
placing one or more pressure sensors in the duct of the heating, ventilation, and air conditioning system.

14. The method of claim 12, further comprising:
placing one or more pressure sensors at an air filter.

* * * * *